UNITED STATES PATENT OFFICE.

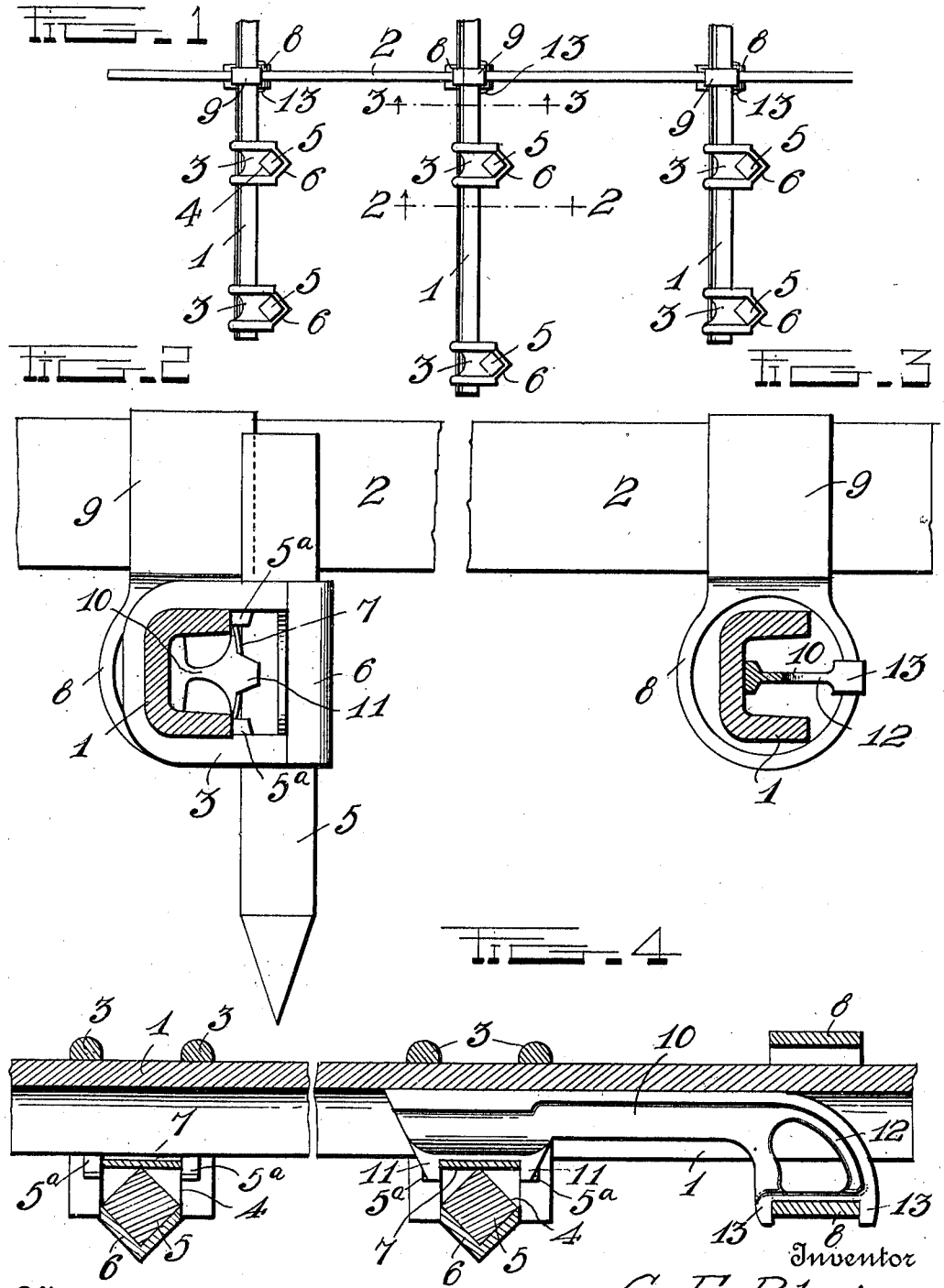

GEORGE E. BLAINE, OF INDIANAPOLIS, INDIANA.

HARROW-TOOTH AND TOOTH-BAR FASTENING.

978,687. Specification of Letters Patent. Patented Dec. 13, 1910.

Application filed May 2, 1910. Serial No. 558,960.

*To all whom it may concern:*

Be it known that I, GEORGE E. BLAINE, a citizen of the United States, residing at Indianapolis, in the county of Marion and State of Indiana, have invented certain new and useful Improvements in Harrow-Tooth and Tooth-Bar Fastenings; and I do declare the following to be a full, clear, and exact description of the invention, such as will enable others skilled in the art to which it appertains to make and use the same.

This invention relates to improvements in harrow tooth and tooth bar fastenings.

One object of the invention is to provide a simple and improved form of harrow tooth fastening whereby the teeth of the harrow may be firmly secured to the tooth bars at any desired position.

Another object is to provide means in combination with the tooth fastenings for holding the tooth bars in position.

With these and other objects in view the invention consists of certain novel features of construction, combination and arrangement of parts as will be more fully described and particularly pointed out in the appended claims.

In the accompanying drawings: Figure 1 is a plan view of a portion of a harrow showing the application of the invention; Fig. 2 is a vertical section on the line 2—2 of Fig. 1; Fig. 3 is a similar view on the line 3—3 of Fig. 1; Fig. 4 is a horizontal sectional view taken centrally through one of the channel iron tooth bars.

Referring more particularly to the drawings 1 denotes the channel iron tooth bars of the harrow and 2 denotes the connecting bars whereby the tooth bars are held together and may be rocked to hold the teeth at the desired angle of inclination. Arranged on the channel iron tooth bars 1 at suitable intervals are tooth holding clips 3 having in their upper and lower sides spike receiving apertures 4 which are of a shape corresponding to the cross sectional shape of the harrow tooth 5. The clips 3 have also formed on their upper and lower inner surfaces pairs of bar engaging lugs 5ª which fit against the rear edges of the tooth bars 1 as shown. The rear walls 6 of the clips 3 are also shaped to fit the rear sides of the teeth, the latter being shown in the present instance as of rectangular shape in cross section and the rear walls 6 of the clips are substantially V-shaped to correspond with the shape of the rear sides of the teeth which are set in the clips as shown.

In order to firmly but detachably hold the teeth in operative position in the clips 3 and to hold the clips at the desired positions on the tooth bars, I provide spring metal tooth fastening plates 7 the ends of which are adapted to bear against the rear edges of the channel bars 1 while the forward corner of the tooth engages the rear side of the fastening plate and is forced down between the same and the V-shaped rear walls of the clips thereby tending to flatten out the fastening plates so that the resiliency of said plates will be applied to force the tooth and the clip rearwardly (or to the right in Fig. 2) and thereby firmly hold the teeth in operative engagement with the clip and at the same time will firmly hold the clip in position on the tooth bar.

In order to hold the tooth bars against lateral movement and to secure said bars at any desired position on the connecting bars I provide suitable connecting devices for attaching the tooth bars to the connecting bars 2, said devices being here shown in the form of annular rings or bands 8 which are loosely engaged with the tooth bars 1 and have on their upper sides integrally formed apertured lugs 9 through which are inserted the connecting bars 2, said bars being rigidly secured to the lugs 9 in any suitable manner.

In each of the channel iron tooth bars 1 adjacent to the ring or band 8 of the bar fastening, is arranged a coupling member 10 which is preferably in the form of a cast iron bar having on one end parallel rearwardly projecting lugs 11 which are adapted to engage the opposite sides of the tooth fastening plates 7 of the tooth nearest the connecting bar. On the opposite end of the coupling bar 10 is formed a head 12 having rearwardly projecting spaced lugs 13 which are adapted to embrace or engage the sides of the ring or band 8 of the bar fastening so that the tooth bars will be held against lateral movement. By shifting the clips and couplings longitudinally of the tooth bars, said bars may be held in any desired position with respect to each other and to the connecting bars 2.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention what I claim is:

1. In a harrow tooth and tooth bar fastening, the combination with a tooth bar, of a clip fitted thereon and having tooth receiving apertures, lugs formed on the inner side of said clip engaging the rear side of the tooth bar, a spring metal tooth fastening plate inserted between said lugs and between the tooth and the adjacent side of the tooth bar in engagement with the clip, and means to hold said tooth bar against lateral movement.

2. In a harrow tooth and tooth bar fastening, the combination with a tooth bar, of a clip fitted thereon and having tooth receiving apertures, lugs formed on the inner side of said clip engaging the rear side of the tooth bar, and a fastening device inserted between said lugs and between the tooth and the tooth bar to bind the tooth within the clip.

3. In a harrow tooth and tooth bar fastening, the combination with a tooth bar, of a clip fitted thereon and having tooth receiving apertures, a fastening device inserted between the tooth and the tooth bar to bind the tooth within the clip, a connecting bar extending across the tooth bar, a band encircling the tooth bar and having an apertured lug engaging the connecting bar, and a coupling secured in the clip on the tooth bar and having a head embracing said band.

4. In a harrow tooth and tooth bar fastening, the combination with a tooth bar, of a clip fitted thereon and having tooth receiving apertures, lugs formed on the inner side of said clip engaging the rear side of the tooth bar, a spring metal plate inserted between said lugs and between the tooth and the adjacent side of the tooth bar to bind the tooth within the clip, a connecting bar extending across the tooth, a band encircling the tooth bar and having an apertured lug engaging the connecting bar, and a coupling arranged within the tooth bar, and provided with lugs engaging the sides of the spring fastening plate and a head embracing said band.

In testimony whereof I have hereunto set my hand in presence of two subscribing witnesses.

GEORGE E. BLAINE.

Witnesses:
GIDEON W. BLAIN,
KATHERINE A. KILLILEA.